April 14, 1953 E. R. PRICE 2,634,839
CLUTCH CONTROL MECHANISM
Filed June 10, 1950 2 SHEETS—SHEET 1

INVENTOR
EARL R. PRICE
BY H. O. Clayton
ATTORNEY

April 14, 1953 — E. R. PRICE — 2,634,839
CLUTCH CONTROL MECHANISM
Filed June 10, 1950 — 2 SHEETS—SHEET 2
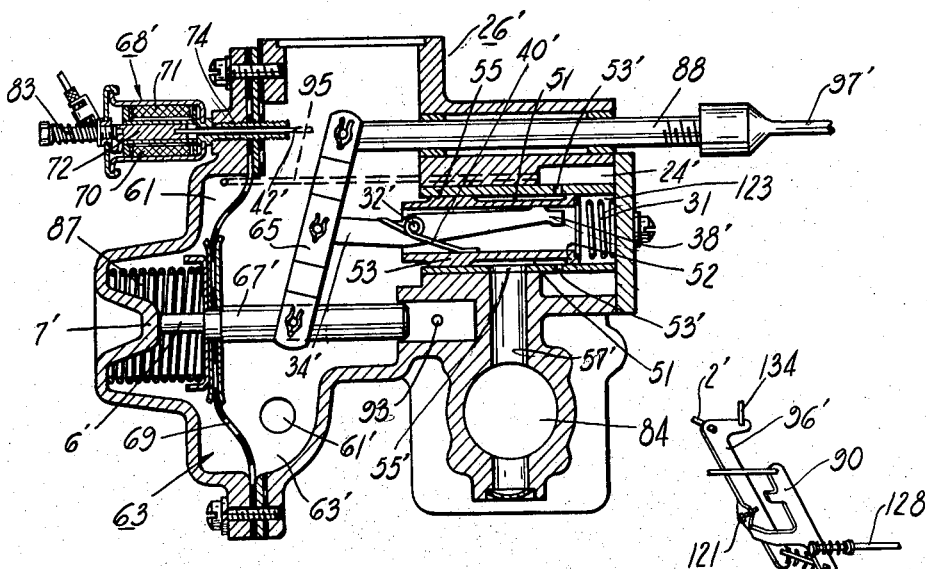
Fig. 2
Fig. 6
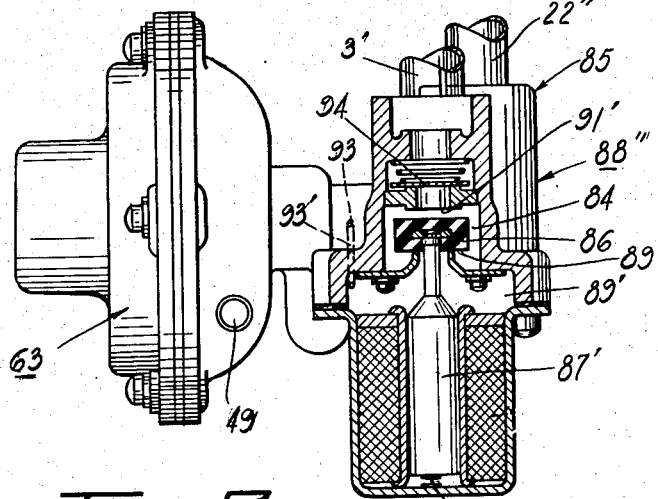
Fig. 3
INVENTOR.
EARL R. PRICE
BY H. O. Clayton
ATTORNEY Patented Apr. 14, 1953

2,634,839

UNITED STATES PATENT OFFICE 2,634,839

CLUTCH CONTROL MECHANISM

Earl R. Price, South Bend, Ind., assignor to Bendix Aviation Corporation, South Bend, Ind., a corporation of Delaware Application June 10, 1950, Serial No. 167,429

9 Claims. (Cl. 192—3.5)

This invention relates in general to means for controlling the operation of a clutch mechanism such as a centrifugal and spring operated friction clutch and in particular to a pressure differential operated power means for controlling the clutch engaging springs of the clutch.

One of the principal objects of my invention is to provide a clutch control mechanism for controlling the springs of a centrifugal and spring operated friction clutch of an automotive vehicle said mechanism being so controlled by the control means of a change speed transmission mechanism of the vehicle as to make possible a smooth engagement of the clutch when said control means is operated to establish the transmission mechanism in its reverse gear setting. In other words with the clutch control mechanism of my invention after the transmission mechanism of the vehicle is established in its reverse gear setting the subsequent engagement of the clutch effects the desired smooth get-away of the vehicle.

Yet another object of my invention is to provide, in an automotive vehicle, a pressure differential operated motor for controlling the springs of a well-known type of centrifugal and spring operated friction clutch constituting a part of the power plant of the vehicle, said motor being controlled by a pressure balanced type of valve which is in turn controlled, in part, by the means for controlling the transmission mechanism of the vehicle.

A further object of my invention is to provide, in an automotive vehicle including a change speed forward and reverse transmission and a certain well known type of centrifugal and spring operated friction clutch, power means for controlling the springs of the clutch said power means including a valve controlled in part by the transmission operating means whereby after the transmission is established in a reverse gear setting the ensuing engagement of the clutch effects the desired acceleration of the vehicle.

Other objects and advantages of the invention will become apparent from the following description of the apparatus taken in connection with the accompanying drawings.

Figure 2 is a sectional view disclosing details of the pressure balanced control valve mechanism of my invention;

Figure 3 is another view of the control valve of my invention disclosing details of the solenoid operated vacuum cut-in valve thereof;

Figure 6 is a view disclosing the principal parts of the connection interconnecting the accelerator, the throttle, and the control valve of Figure 2.

Figures 4, 5:
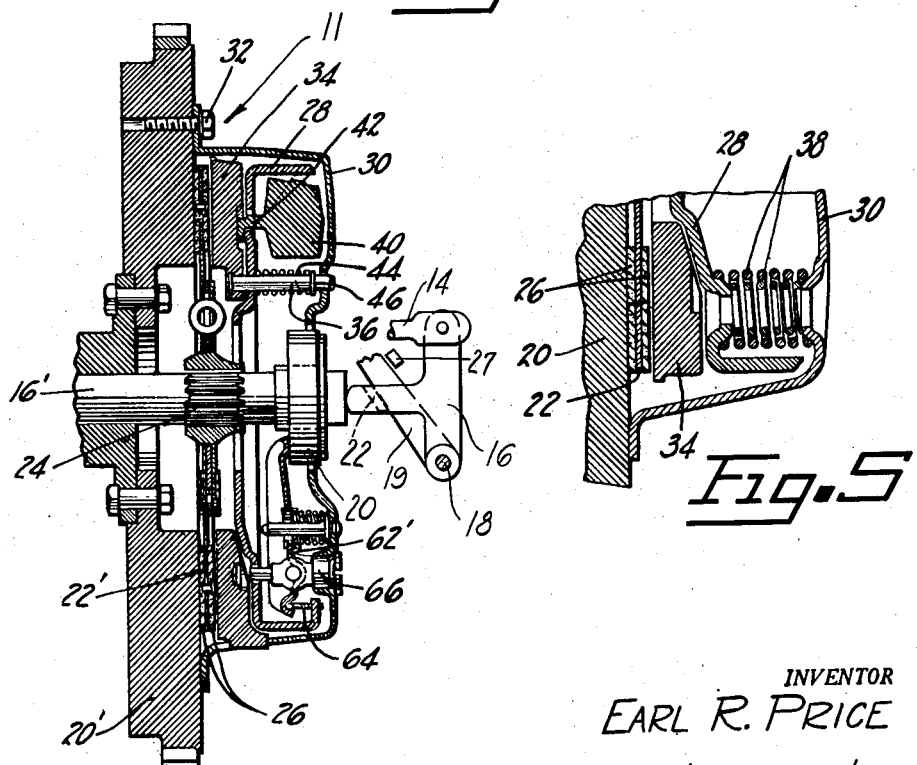
Figure 4 is a sectional view disclosing details of the spring and centrifugal operated friction clutch of my invention.
Figure 5 is an enlarged fragmentary sectional view of the portion of the clutch structure of Figure 4 disclosing the clutch engaging springs thereof.

Describing now that embodiment of the invention disclosed in the several figures of the drawings the principal elements thereof consist of a single acting vacuum motor 10 comprising a casing 12 and a power element such as a piston, not shown, which is connected to a centrifugal and spring operated friction clutch 11, Figure 4, of conventional design and to which no claim is made. One end of the casing of the motor, a portion of the body therefor and the power element together outline a control chamber the gaseous pressure within said chamber being controlled to control the operation of the motor. The force transmitting means interconnecting the power element of the motor with the clutch preferably includes a flexible cable 14 connected to a crank 16; and said crank is rotatably mounted on a shaft 18 and is provided with a projection 19 which contacts a throw-out bearing 20. A foot operated clutch pedal 21 rotatably mounted on the shaft 18 and contactable with a flange 22 extending from the crank 16, is also preferably included in the clutch operating mechanism.

Briefly describing the clutch mechanism 11 a flywheel 23', drivably connected with an internal combustion engine 62, constitutes the driving element of the clutch, and a disc 22', drivably connected to a propeller shaft 16' at 24 and provided with friction rings 26, constitutes the driven clutch element. The means for forcing the driven clutch element into driving engagement with the driving clutch element comprising a pressure plate 28, mounted within a cup shaped housing 30 secured to the flywheel by fastenings 32. A ring 34, mounted on the plate by a plurality of pins 36, constitutes, together with the plate, a pressure applying unit, said unit being normally urged to the left to engage the clutch, by means of a plurality of angularly spaced clutch springs 38, Figure 5.

A plurality of angularly spaced centrifugally operated weight members 40, each having a lever-like shank portion 42 extending through the plate 28 and into engagement with the ring 34, functions to supplement the clutch engaging action of the springs 38 at or above a predetermined R. P. M. of the flywheel, the centrifugal force developed by the rotating weights serving to urge the weights outwardly in direct proportion to the speed of the flywheel thereby tending to force the ring from the plate and into engagement with the driven clutch element 26. Springs 44, sleeved over the pins 36 between the plate 28 and stops 46, serve as return springs to keep the plate and ring together when the flywheel is static or below the aforementioned critical angular speed. The loading of the clutch is thus the additive result of the effect of the clutch springs 38 having a constant maximum effect and the centrifugally operated weights 40, the effect of the latter being a variable the value of which is a function of the R. P. M. of the flywheel.

The invention in one of its aspects is specifically directed to power operated means for controlling both the disengagement and the engagement of the aforementioned clutch in such a fashion as to result in its most effective operation under various conditions of service of the vehicle particularly when the latter is established in its reverse gear setting; and the aforementioned clutch motor 10 is provided to effect the desired end.

Continuing the description of the clutch mechanism of Figures 4 and 5 clutch disengaging finger members 62', actuated by the throw-out bearing 20, are fulcrumed intermediate their ends upon pins 66, secured to the housing member 30. The pressure plate 28 may also be operated to disengage the clutch by the aforementioned clutch pedal 21 a spring 25 serving to maintain said pedal in its off position against a stop 27.

One end of the clutch operating motor 10, that is, the end of the same constituting a part of the aforementioned power compartment of the motor, is connected by a conduit 22" to a compartment 24' of a control valve unit indicated as a whole by the reference numeral 26' and two different views of said unit are disclosed in Figures 2 and 3 of the drawings. The casing of the unit 26' is provided with a cylindrically shaped bore to receive a sleeve member 55 constituting one of the two parts of a three-way valve; and said casing is counterbored to provide the aforementioned compartment 24', Figure 2.

A valve member 53, which is biased inwardly by a spring 31 and which is provided with a cylindrically shaped bore to permit the passage of air therethrough, constitutes the other part of the two part three-way valve. One end of the latter valve member is provided with diametrically spaced openings to receive therethrough a pin 32' and said pin extends through a connecting pin 34', one end of which extends within the member 53. The other end of the pin 34' extends beyond the valve member 30 and is detachably connected to a two part lever 65. An end portion 38' of the pin 34' is preferably biased into engagement with the interior of the valve member 53 by a coil spring 40'. There is thus provided means for readily disconnecting valve member 53 from the lever 65; for the pin 32' may be removed by driving the same through the pin 34', thereby separating the latter from the valve 53.

As is disclosed in Figure 2, the lever 65 is pivotally connected at one of its ends to a rod 88; and the movement of this rod to the left, Figure 2, is limited by a stop pin 42' constituting an important feature of my invention. The other end of the lever 65 is pivotally connected to a pin 67' which is slidably received at one of its ends in a portion of the valve casing and which is secured at its other end to a flexible diaphragm 69. This diaphragm constitutes the power element of a valve operated pressure differential operated motor indicated as a whole by the reference numeral 63; and the operation of said motor is in large measure controlled by the gaseous pressure within the control compartment 61 of said motor and by compression spring 87 within said compartment. A compartment 63' of the motor 63 is vented to the atmosphere via a port 61' to which is connected a conduit 49 which leads to an air cleaner 50, Figure 1.

The stop pin 42' constitutes a part of a stop mechanism which is indicated as a whole by the reference numeral 68'; and this mechanism is disclosed in detail in Figure 2. The stop mechanism preferably includes a solenoid 70 comprising a two part casing, a grounded coil 71 and an armature 72 the latter being bored at one end to receive the stop pin 42' tightly fitted therein. This solenoid is mounted upon the casing of the valve motor 63 by a stud 74 secured to a solenoid casing and preferably threadedly mounted within the motor casing. The coil 71 of the solenoid is electrically connected to a breaker switch 78 which is biased to its open position by a spring, not shown, and which is closed by means of the shifter lever 80 of the transmission operating mechanism of the vehicle. The parts of the mechanism are preferably so constructed and arranged and so operative that the switch 78 is closed when the shift lever is actuated to establish a change speed forward and reverse transmission 79 in its reverse gear setting. As disclosed in Figure 1 the switch 78 is electrically connected to the grounded battery 70'.

A pin 83, preferably threadedly mounted on and extending within a part of the casing of the solenoid 70 serves as a means for determining the released position of the stop pin 42'. When the solenoid is energized the armature 72 is moved to the right, Figure 2, moving the pin 42' to the dotted line position disclosed in this figure; and when the solenoid is in its de-energized state a throttle opening operation of the accelerator serves, if the accelerator is depressed a certain amount, to move the pin 42' and armature to the left, Figure 2, the armature being moved into abutment with the end of the pin 83. There is thus provided, by the adjustable stop mechanism 68', means for limiting the clutch engaging operation of the valve 53, 55 there being a reverse gear setting of the mechanism and another setting of said stop mechanism for all other settings of the transmission. The stop mechanism 68' and its cooperation with the remainder of the clutch control mechanism of my invention and with the centrifugal and spring operated friction clutch is described in greater detail hereinafter.

The valve member 53 is recessed at 51 and the end of said member provides a land portion 52 which is adapted, in the operation of the valve, to be positioned to register the recess 51 with ports 53' in the valve member 55. The valve member 53 is also operated so that the land portion 52 covers the ports 53', that is, laps the valve; and said valve member is also operated to interconnect said ports with the air cleaner 50 via the valve compartment 63' and the interior of said member.

The valve member 55 is provided with an opening 55' to register with one end of a duct 57' in the valve casing, said duct registering at its other end with a chamber 84 of a three-way vacuum cut-in valve indicated as a whole by the reference numeral 85 and disclosed in detail in Figure 3. The latter valve includes a valve member 86 secured to one end of an armature 87' of a solenoid 88". When the solenoid is energized the valve member 86 moves downwardly, Figure 3, to seat at 89, thereby connecting the duct 57' with the intake manifold 61" of the internal combustion engine 62 of the vehicle via a conduit 3' and the aforementioned chamber 84; and when the solenoid is de-energized, a spring 91 serves to move the armature upwardly, Figure 3, to seat the valve member 86 at 91', thereby cutting off the vacuum connection and venting the duct 57' to the atmosphere via the air cleaner 50, chamber 63' of the valve motor, the recess in the valve casing which houses the outer end of the pin 67', a duct 93 in the valve casing, a duct 93' in said casing, and a chamber 89'. A spring loaded check valve 94 may be included in the vacuum connection between the intake manifold and the valve chamber 84 thereby providing a means for maintaining the clutch disengaged in the event the conduit is broken when the clutch operating motor 10 is energized.

Completing the description of the valve unit 85 the casing of said unit is provided with a duct 95, Figure 2, permanently interconnecting the control compartment 63' of the valve motor 63 with the aforementioned valve compartment 24'. There is thus provided fluid transmitting means for at all times interconnecting the motor compartment 63', the valve compartment 24', and the control compartment of the clutch operating motor 10. It follows therefore that the operation of the clutch control mechanism constituting my invention is controlled by controlling the gaseous pressure within the compartment 63'.

There is thus provided a compact valve control unit comprising a multi-sectional casing housing a three-way control valve 53, 55 and also housing means for operating said valve comprising a spring and pressure differential operated motor and an accelerator operated pin, said pin and the power element of the motor being connected with the movable part of said valve by means of a floating lever member.

Describing now the force transmitting means interconnecting the accelerator 118 of the car with a throttle operating crank 145 and with the valve operating rod 88, said rod is connected to a rod 97' and this rod is pivotally connected with a lever member 90. The lower end of this lever member is pivotally mounted upon a floating pin 90' and one end of this pin is mounted in one end of a bell crank lever 96' which is pivotally mounted upon a fixed pin 2'. The lever member 90 is connected to the accelerator 118 by means of a rod 128, a bell crank lever 130 and a link 132 all as disclosed in Figure 1; and as disclosed in the latter figure, the bell crank lever 96' is connected to the throttle valve of the carburetor by means of a link 134, a crank 136, a rod 138, a crank 140, a link 142 and the crank 145 connected to the throttle valve 120. A spring 101, which is weaker than a throttle valve return spring 101', is operative, together with a return spring 102, to return the accelerator to its throttle closed position and to move the valve member 53 to the right, Figure 2, to open the three-way valve, that is operate the same to effect a clutch disengaging operation of the motor 10. The spring 101 is preferably sleeved over the pin 90' and is connected at its ends to the levers 90 and 96'. The operation of this part of the mechanism of my invention will be described in greater detail hereinafter when the operation of the entire clutch control mechanism is described in detail.

Figure 1:
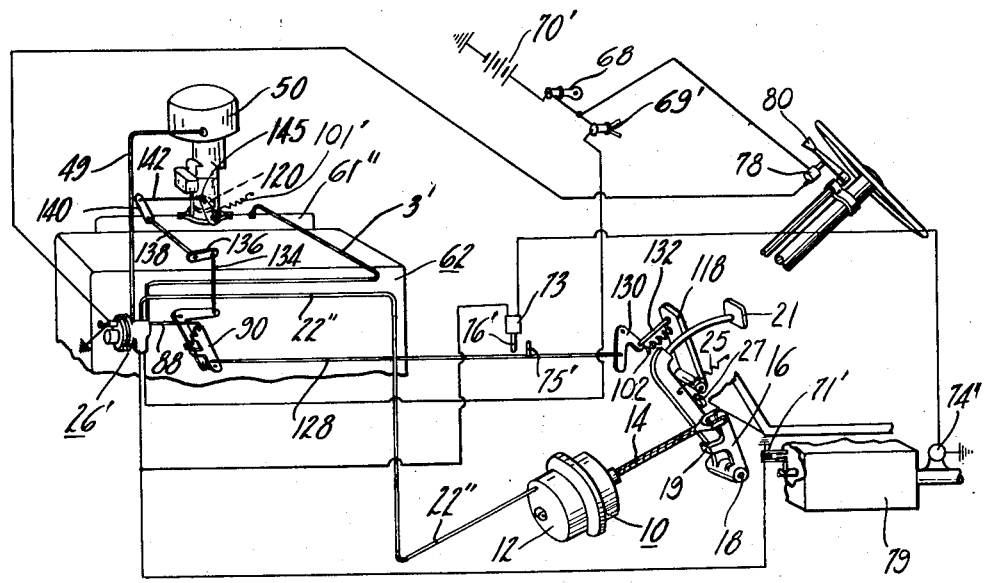
Figure 1 is a diagrammatic view disclosing the principal features of my invention.

Describing now an important feature of my invention, the solenoid 88" which operates the vacuum cut-in valve 86, is controlled by the electrical controls disclosed in Figure 1. Describing this mechanism the grounded battery 70' is wired in series with an ignition switch 69', the solenoid 88", and a grounded switch 71' which is opened by the second and high gear shift rail of the transmission 72' when said transmission is established in its high gear setting. With this electrical hookup the vacuum cut-in valve is opened, that is, the valve member 86 is seated at 89, when the switch 69' is closed and the transmission is established in any gear except high gear; accordingly, with the vacuum cut-in valve opened there is provided a source of vacuum to make possible a clutch disengaging operation of the motor 10 when the accelerator is released to open the valve 53, 55, an operation which is described in detail hereinafter.

With the vehicle traveling in high gear it is desirable to automatically disengage the clutch when the accelerator is released and the speed of the vehicle is appreciably reduced, for example when the vehicle is being driven very slowly in traffic; and to effect this operation of the mechanism of my invention there is provided a switch 73 which is closed when the accelerator is released to close the throttle, and a grounded switch 74' which is operated by a vehicle speed responsive governor, not shown. To effect the operation of the switch 73 there is provided a flange 75' on the rod 128, said flange being contactable with a switch operating member 76'.

As is disclosed in Figure 1 the switches 73 and 74' are electrically connected in series in an electrical circuit which is wired in parallel with the grounded transmission operated switch 71'. Preferaly the switch 73 is so constructed and so operated by the flange 75' that the same is closed just prior to the complete closing of the throttle valve; and it follows, therefore, that the switch 73 is not opened until after the throttle has been opened to a limited degree.

Describing now the complete operation of the mechanism constituting my invention and incidentally completing the description of the parts thereof not heretofore described, when the accelerator is released to close the throttle and idle the internal combustion engine, the intake manifold of said engine is partially evacuated. There is thus provided a source of vacuum for energizing the motor 10 to disengage the friction clutch of the motor vehicle; and this operation is effected inasmuch as with the release of the accelerator the movable three-way valve member 53 is moved to place said motor in air transmitting connection with the manifold. The valve member 53 and the means for operating the same then assume the relative positions disclosed in Figure 2, the end portion 6' of the pin 67' abutting a stop 7' pressed in from the wall of the valve housing. Air is then withdrawn from the clutch motor and the motor compartment 63' into the intake manifold via the conduit 3', the valve compartment 84, the duct 57', recess 51, ports 53', the compartment 24', the duct 95 interconnecting the compartment 24' with the valve motor compartment 61, and the conduit 22' interconnecting the compartment 24' with the control chamber of the clutch motor 10.

The compartment 61 being then partially evacuated the diaphragm 69 is moved, by the differential of pressures acting on the same, to the position disclosed in Figure 2; for the gaseous pressure within the compartment 61 is at this time the same as that within the intake manifold of the idling engine and this gaseous pressure is of course the same as that within the control compartment of the then energized clutch operating motor 10. It is to be noted that in this clutch disengaged position of the parts the valve member 53 is moved to the left, Figure 2, to a position just short of a closing off of the ports 53' by the land portion 52 of said valve member.

Now it is to be noted that the air transmitting connection with the intake manifold is made possible by virtue of the fact that the valve member 86 of the vacuum cut-in valve unit 85 is at the time removed from the seat 91'; for the solenoid 88'' which actuates said valve member is at the time energized to move the armature 87' and the valve member 86 connected thereto downwardly, Figure 2. Explaining this operation the solenoid 88'' is at this time energized by virtue of a closing of the grounded breaker switch 74'; for inasmuch as the car is at a standstill the vehicle speed responsive governor, not shown, is then operative to close said switch. The governor is so constructed that when the vehicle is at a standstill or is traveling below a relatively low speed, say ten miles per hour, then the governor is operative to close the grounded switch thus completing an electrical circuit including the switch 74', the then closed accelerator operated switch 73, the solenoid 88'', the cutout switch 68, the ignition switch 69' of the vehicle and the grounded battery 70'.

It is also to be noted at this juncture that when the valve operating motor 63 is energized the movement to the left, Figure 2, of the diaphragm 69 of said motor not only serves to move the valve member to the position disclosed in said figure but also serves to compress the spring 87; and as will be described hereinafter the degree of compression of said spring, determined by the operation of the power element 69, constitutes a factor in the control of the valve to effect the stage operation of the clutch operating motor.

Continuing now the description of the cycle of clutch control operations of the motor 10, said motor having been energized to disengage the clutch the driver will then probably wish to establish the change speed transmission of the vehicle in a relatively low gear setting. This is, of course, done by moving the transmission controlling selector lever, not shown, to its low gear position. The power plant of the vehicle is now prepared to effect a forward movement of the vehicle, accordingly the driver depresses the accelerator to open the throttle and effect a clutch engaging operation of the clutch operating power means. Describing the latter operation with the first increment of movement of the accelerator the lever 90, Figure 6, is rotated counterclockwise about the pin 90' as a fulcrum, this operation being made possible by virtue of the fact that the spring 101 is weaker than the throttle spring 101' and the latter spring is strong enough to prevent the rotation of the lever 96'. In this operation the lever 90 moves counterclockwise until a flange 119 at the upper end of the same contacts an adjustable stop 121 on the lever 96'; and this movement of the lever 90 results in a movement of the rod 88 to the left, Figure 2, to rotate the lever member 65 about its pivotal connection with the pin 67'. The valve member 53 is thus moved to the left, Figure 2, the lever 65 operating as a lever of the second class to place the valve ports 53' in communication with a valve chamber 123 which chamber is at all times connected to the atmosphere via the interior of the valve member 53 and the valve compartment 63', the latter being at all times vented to the atmosphere via the air cleaner 50. It is to be noted that in this initial operation of the valve the degree of movement of the valve member 53 is, by virtue of the lever operation, about twice as great, as the degree of movement of the rod 128 connected to the accelerator. As will be brought out in the description that follows there is thus provided a valve operating mechanism operative to quickly effect the first stage operation of the motor 10 during the first increment of depression of the accelerator, said increment being relatively small.

The valve member 53 having been moved to the left to vent the valve compartment 123 to the atmosphere there results a relatively rapid flow of air into both the control compartment of the clutch operating motor 10 and the compartment 61 of the valve operating motor 63; and this flow of air results in a clutch engaging operation of the motor 10. Describing this operation the power element of said motor is moved to the right, Figure 1, by the clutch springs and when said springs have expanded sufficiently to bring the clutch plates just short of engagement with each other, the movement of the power element is arrested.

Explaining this arresting operation the clutch springs, by their expansion, serve to maintain a relatively low gaseous pressure, that is vacuum, within the control chamber of the motor 10. Now inasmuch as said control chamber is at all times connected to the valve chamber 123 and motor chamber 61 it follows that the gaseous pressure within said chambers is also maintained relatively low by virtue of the expansion of the clutch springs. As described above, when the clutch springs have expanded a certain amount, that is, when their vacuum creating pulling power has decreased to a certain factor, then the spring 87 automatically moves to the right, Figure 2, that is, expands, thereby lapping the three-way valve 53, 55. Describing this operation of said valve the valve member 53 moves to the right until the ports 53' register with the land portion 52 of said valve member; and when this occurs the flow of air into the chamber 61 and the motor 10 is automatically cut off; and the system is then in equilibrium.

In this operation the lever 65 rotates counterclockwise about the pivotal connection between the rod 88 and said lever, said pivotal connection acting as a fulcrum. As stated above, the parts of the mechanism of my invention are so constructed and arranged, particularly the strength or load of the clutch springs, the area of the diaphragm 69 and the rate of the spring 87, that the valve is lapped, to arrest the movement of the power element of the clutch motor, when the clutch plates are just short of contact with each other.

This operation of the motor 10 is usually described as the first stage operation thereof and it is to be particularly noted that by varying the rate of the spring 87 that the termination of the first stage operation of the motor may be varied. In other words, by varying the rate of said spring there is provided means for varying the degree of separation of the clutch plates when the first stage of clutch engaging operation of the motor 10 is completed. It is to be noted that the mechanism of my invention is preferably so constructed that this first stage of clutch engaging operation of the motor is completed or at substantially the same time as the opening of the throttle is initiated and as a result of a relatively small degree of depression of the accelerator. This first stage operation of the motor is completed very quickly and with a normal operation of the accelerator the driver may momentarily arrest the depression thereof when the resistance of the throttle return spring 101' is encountered; and this momentary arresting of the depression of the accelerator will suffice to insure a completion of the aforementioned first stage of clutch engaging operation of said motor before the throttle is opened.

To effect the step by step second stage of clutch engaging operation of the motor 10 the driver continues the depression of the accelerator thereby effecting a clockwise rotation of the bell crank lever 96' to open the throttle; and this operation of the accelerator serves to again effect a leftward movement of the rod 88 and a leftward movement of the valve member 53 the lever 65 again fulcruming about its pivotal connection with the pin 67'. This operation, as with the above described first stage clutch engaging operation of the motor, serves to again place the motor compartment 61 and the control compartment of the clutch motor 10 in communication with the atmosphere, thereby decreasing the gaseous pressure therein. The clutch springs then automatically resume their expansion to force the clutch plates into contact with each other. As before, if the driver arrests the movement of the accelerator after this resumption of movement of the valve member 53 said member again moves to its lapped position by virtue of a resumption of the expansion of the spring 87. In this valve lapping operation the direction of movement of the valve member 53 is again reversed, the lever 65 fulcruming about its connection with the rod 88. As with the above described first stage of clutch engaging operation of the mechanism the spring 87 expands to move the valve member 53 to its lapped position when the differential of pressure acting on the diaphragm 61 is reduced to a certain factor by the flow of air into the chamber 61. As with the first stage operation of the mechanism, the valve is lapped when the force exerted by the spring 87 equals the force exerted by the diaphragm 61.

The clutch plates are thus first moved just short of engagement with each other and then pressed into contact, said latter operation being effected by a succession of steps if the driver chooses to depress the accelerator by a succession of steps; and he will probably do this if he desires to effect a slipping operation of the clutch. The latter operation is, of course, necessary in effecting a very slow movement of the car such as when parking the same. The first stage operation of the mechanism, that is, the operation to effect the relatively rapid movement of the clutch plates up to a point just short of engagement with each other, will, by virtue of the relatively fast movement of the valve member 53 and its degree of movement during the initial increment of movement of the accelerator, be effected very quickly. The second stage clutch engaging operation of my clutch control mechanism is effected more slowly inasmuch as the bell crank lever 96' is operated as a throttle operating lever of the first class, the levers 96' and 90 moving as a unit about the pin 2'; and by virtue of this operation the degree of clutch engaging movement of the valve member 53 is relatively small compared to the degree of movement of the accelerator to effect said movement. It is also to be remembered that the first stage of clutch engaging operation of the clutch is, with a normal operation of the accelerator, completed before or at substantially the same time as the opening movement of the throttle is initiated. The adjustable stop 68' serves to control the mechanism to limit the clutch plate loading factor said factor preferably being such as to prevent a stalling of the engine.

This adjustable stop mechanism taken in combination with the centrifugal and spring operated friction clutch, constitutes the most important feature of my invention; for when the shift lever is actuated to establish the transmission mechanism 72' in its reverse gear setting the stop mechanism 68', by virtue of the energization of the solenoid 70, serves to limit the leftward movement of the rod 88 and thereby limit the clutch engaging operation of the valve. It follows that this operation of the mechanism of my invention insures a smooth engagement of the clutch. This is particularly desirable if the vehicle is relatively light in weight for it is then desired to effect a light engagement of the clutch when the transmission is established in its reverse gear setting. The relatively limited leftward movement of the rod 88 results in a relatively high vacuum in the control compartment 61 of the valve operating motor 63; and this operation serves to appreciably limit the clutch engaging expansion of the springs 38 of the clutch. The remainder of the engagement of the clutch is then effected by the centrifugal weights 40 the clutch plate loading being directly proportional to the speed of the flywheel 20' which reflects the speed of the engine.

In all other settings of the transmission except reverse the stop mechanism 68' serves again to limit the engagement of the clutch to a factor which will insure the desired acceleration of the vehicle and operation of the engine. As to this operation the driver may, by an operation of the adjustable screw 83, vary the maximum clutch plate loading inasmuch as said adjustment determines the extent of leftward movement of the pin 42' thereby determining the limit to which the valve may be opened. Some drivers are careless in the operation of the accelerator pedal in getting the vehicle under way after an operation of the transmission, however with the clutch control mechanism of my invention the clutch plate loading is limited to a certain maximum despite such carelessness.

There is thus provided, by the friction clutch control mechanism of my invention, power means for effecting the disengagement of the clutch when the accelerator is released to idle the engine and the transmission is established in any one of its low, reverse, or second gear settings; or when the accelerator is released to idle the engine, the vehicle is traveling below governor speed or is at rest, and the transmission is established in its high gear setting. With the clutch disengaging operation of the power means of my invention the accelerator, in its operation of the switch 73 after three-way valve 53, 55 cooperates with the governor in its operation of closing the switch 74′.

As to the clutch engaging operation of the power means of my invention, said operation is effected, through the intermediary of the floating lever 65, by an operation of the accelerator and an operation of the valve operating motor 63. It is also to be noted that with the clutch control mechanism of my invention if the driver should fail to depress the accelerator to operate the three-way valve 53, 55 just after the transmission is established in its high gear setting, that the bleed of air into the motor 10 via the ducts 93 and 93′ will nevertheless insure an engagement of the clutch. This operation of the mechanism might be effected if the transmission were placed in its high gear setting just before the vehicle started to descend a grade.

The valve mechanism of my invention insures a two stage operation of the clutch motor and a resulting smooth engagement of the clutch with any mode of operation of the accelerator; for the operation of the leverage changing force transmitting connection 90, 96′, etc. and the throttle spring 101′ virtually insure this two stage operation of the mechanism when the clutch is engaged as a result of a normal operation of the accelerator. The floating lever 65 interconnecting the reciprocable valve member 53 with the accelerator operated rod 88 and the power element 69 of the valve operating motor 63, provide a very simple, yet effective, means for operating the three-way control valve 53, 55; the varying of the rate of the spring 87 provides a means for determining when the first stage of engagement of the clutch is completed; the particular force transmitting means interconnecting the throttle valve, the valve member 53 and the accelerator 118 insures a completion of the first stage of engagement of the clutch just as the throttle is opened or is about to be opened; and the step by step clutch engaging or disengaging operations of the power element of the clutch motor insures the desired maneuvering of the vehicle in traffic or when the vehicle is being parked.

It is thought that the invention and many of its attendant advantages will be understood from the foregoing description and through said invention has been illustrated in connection with but one modification thereof, it will be apparent that various changes may be made in the form, construction and arrangement of the parts without departing from the spirit and scope of the invention or sacrificing all of its material advantages, the form hereinbefore described being merely a preferred embodiment.

I claim:

1. In an automotive vehicle the combination with a change speed forward and reverse transmission mechanism, a shift lever constituting part of the mechanism for controlling the operation of the transmission, and a centrifugal and spring operated friction clutch; of power means for controlling the operation of the spring means of the clutch and means, controlled by the shift lever, for controlling the operation of the power means whereby the spring means is operative to effect a partial engagement of the clutch, said operation being effected after the transmission is established in its reverse gear setting the remainder of the engagement of the clutch being effected by the centrifugal means of the clutch.

2. In an automotive vehicle the combination with a change speed forward and reverse transmission mechanism and a centrifugal and spring operated friction clutch, of power means, including a pressure differential operated motor and a pressure balanced valve for controlling said motor, for controlling the operation of the spring means of the clutch, and means for controlling the operation of the power means whereby the spring means is operative to effect a partial engagement of the clutch, said operation being effected after the transmission mechanism is established in its reverse gear setting the remainder of the engagement of the clutch being effected by the centrifugal means of the clutch.

3. In an automotive vehicle the combination with a change speed forward and reverse transmission mechanism, a shift lever, and a centrifugal and spring operated friction clutch, of power means, including a pressure differential operated motor and a pressure balanced valve for controlling said motor, for controlling the operation of the spring means of the clutch, and means, including a solenoid and a stop operated by said solenoid and controlled by the shift lever, for controlling the operation of the power means whereby the spring means is operative to effect a partial engagement of the clutch, said operation being effected after the transmission mechanism is established in its reverse gear setting, the remainder of the engagement of the clutch being effected by the centrifugal means of the clutch.

4. In an automotive vehicle provided with a change speed forward and reverse gear transmission, a shift lever, and a centrifugal and spring operated friction clutch, power means for controlling the operation of the spring means of the clutch including a pressure differential operated motor, valve means for controlling the operation of the motor, and means for controlling the operation of the valve means, the parts of the mechanism being so constructed and arranged and so operative that the spring means is only partially expanded to engage the clutch when the shift lever is moved to its reverse gear setting.

5. In an automotive vehicle provided with a change speed forward and reverse gear transmission, a shift lever, and a centrifugal and spring operated friction clutch, power means for controlling the operation of the spring means of the clutch including a pressure differential operated motor, valve means for controlling the operation of the motor, and means, including stop means controlled by the shift lever, for controlling the operation of the valve, the parts of the mechanism being so constructed and arranged and so operative that the spring means is only partially expanded to engage the clutch when the transmission is established in its reverse gear setting.

6. Power means adapted to control the operation of the friction clutch of an automotive vehicle including a pressure differential operated motor, valve means, including a movable valve member, for controlling the operation of the motor, means for actuating the movable valve member including a spring and pressure differential operated motor and a pedally operated member connected to the power element of the motor, together with means for limiting the clutch engaging movement of pedally operated member thereby limiting the clutch engaging operation of the valve means.

7. Power means adapted to control the operation of the friction clutch of an automotive vehicle including a pressure differential operated motor, valve means, including a movable valve member, for controlling the operation of the motor, means for actuating the movable valve member including a spring and pressure differential operated motor, a floating lever member, means interconnecting the lever member with the latter motor, and a pedally operated member connected with the lever member, together with means for limiting the clutch engaging movement of the pedally operated member thereby limiting the clutch engaging operation of the valve means.

8. Power means adapted to control the spring means of a centrifugal and spring operated friction clutch including a pressure differential operated motor, a valve, including a movable valve member, for controlling the operation of the motor, and means for operating and controlling the operation of said valve including a floating lever, force transmitting means interconnecting said lever with the movable valve member, pedally operated means connected to one end of the lever, a spring and pressure differential operated motor connected to the other end of the lever and operative to lap the valve, together with stop means adapted to be contacted by that end of the lever which is operated by the pedally operated means, said stop means functioning to limit the clutch engaging operation of the valve to thereby limit the engagement of the clutch by the pressure differential of the motor.

9. Power means adapted to control the spring means of a centrifugal and spring operated friction clutch including a single acting pressure differential operated motor, a three-way valve, including a movable valve member, for controlling the operation of the motor, and means for operating and controlling the operation of said valve including a floating lever, force transmitting means interconnecting said lever with the movable valve member, pedally operated means connected to one end of the lever, and a spring and pressure differential operated lever connected to the other end of the motor and operative to lap the valve, together with adjustable stop means adapted to be contacted by that end of the lever which is operated by the pedally operated means, said stop means functioning to limit the clutch engaging operation of the valve to thereby limit the engagement of the clutch by the pressure differential of the motor.

EARL R. PRICE.

References Cited in the file of this patent

UNITED STATES PATENTS

| Number | Name | Date |
|---|---|---|
| 1,985,428 | Sanford | Dec. 25, 1934 |
| 2,051,894 | Price et al. | Aug. 25, 1936 |
| 2,060,870 | Hunt | Nov. 17, 1936 |
| 2,081,581 | Fawick | May 25, 1937 |
| 2,320,182 | Hill et al. | May 25, 1943 |
| 2,420,996 | Price | May 20, 1947 |